United States Patent
Azem (10) Patent No.: US 10,129,768 B1
(45) Date of Patent: Nov. 13, 2018

(54) DETERMINING POTENTIAL INTERFERENCE IN A WIRELESS NETWORK

(71) Applicant: Sprint Spectrum LP, Overland Park, KS (US)

(72) Inventor: Khaled Azem, Sterling, VA (US)

(73) Assignee: Sprint Spectrum L.P., Overland Park, KS (US)

(*) Notice: Subject to any disclaimer, the term of this patent is extended or adjusted under 35 U.S.C. 154(b) by 0 days.

(21) Appl. No.: 15/354,209

(22) Filed: Nov. 17, 2016

(51) Int. Cl.
*H04W 24/02* (2009.01)
*H04L 5/00* (2006.01)
*H04B 17/318* (2015.01)
*H04B 17/345* (2015.01)

(52) U.S. Cl.
CPC .......... *H04W 24/02* (2013.01); *H04B 17/318* (2015.01); *H04B 17/345* (2015.01); *H04L 5/0048* (2013.01)

(58) Field of Classification Search
CPC ... H04W 24/02; H04B 17/318; H04B 17/345; H04L 5/0048
USPC ...................................................... 455/67.13
See application file for complete search history.

(56) References Cited

U.S. PATENT DOCUMENTS

| | | | | |
|---|---|---|---|---|
| 5,655,217 A * | 8/1997 | Lemson | ............... | H04B 7/0837 455/450 |
| 5,862,479 A * | 1/1999 | Cutler, Jr. | ............... | H04B 7/195 455/428 |
| 6,256,477 B1 * | 7/2001 | Eidson | ................. | H04B 1/1027 455/296 |
| 6,771,934 B2 * | 8/2004 | Demers | ................ | H04B 1/7107 375/148 |
| 7,454,334 B2 * | 11/2008 | Agranat | ............... | A01K 11/008 119/713 |
| 7,848,782 B2 * | 12/2010 | Stern-Berkowitz | ......................... | H04W 16/18 455/423 |
| 8,121,302 B2 * | 2/2012 | Skuruls | ................ | H03G 1/0088 381/101 |
| 8,165,073 B2 * | 4/2012 | Wang | ................. | H04B 7/15542 370/230 |
| RE44,237 E * | 5/2013 | McHenry | ............... | H04W 72/08 455/454 |
| 8,483,620 B2 * | 7/2013 | Horn | .................... | H04W 72/082 455/67.13 |
| 8,781,400 B2 * | 7/2014 | Lindoff | ................ | H04J 11/0026 370/329 |

(Continued)

OTHER PUBLICATIONS

Salo, Mobility Parameter Planning for 3GPP LTE: Basic Concepts and Intra-Layer Mobility, pp. 1-21.

*Primary Examiner* — Hai V Nguyen (57) ABSTRACT

A potential interference is determined for specific geographic locations of a wireless network based on signal measurements performed by wireless devices at said specific geographic locations. Obtaining power measurements of reference signals sensed at a wireless device at a specific location, and determining a potential interference caused at the specific location based on the power measurements. The power measurements comprise measurements of a reference signal power (RSRP) performed by a wireless device at the specific location. The wireless device may perform multiple measurements of signal power at various locations, and submit to the network measurements recorded at each location. The measurements may be performed periodically or triggered by the network.

18 Claims, 6 Drawing Sheets

(56) References Cited

U.S. PATENT DOCUMENTS

| Patent/Publication No. | | Date | Inventor | Classification |
|---|---|---|---|---|
| 8,971,818 | B2* | 3/2015 | Maaref | H04W 16/10 375/224 |
| 9,025,478 | B2* | 5/2015 | Jung | H04W 72/082 370/252 |
| 9,065,492 | B2* | 6/2015 | Groell | H01Q 21/28 |
| 9,094,986 | B2* | 7/2015 | Horn | H04W 72/082 |
| 9,167,451 | B2* | 10/2015 | Kim | H04W 24/02 |
| 9,185,614 | B2* | 11/2015 | Das | H04W 36/0083 |
| 9,277,487 | B2* | 3/2016 | Wang | H04J 11/004 |
| 9,288,772 | B2* | 3/2016 | Vrzic | H04W 52/38 |
| 9,350,477 | B1* | 5/2016 | Jung | H04W 72/082 |
| 9,402,195 | B2* | 7/2016 | Burley | H04W 24/02 |
| 9,439,061 | B2* | 9/2016 | Austin | H04W 8/18 |
| 9,450,694 | B1* | 9/2016 | Jung | H04W 72/082 |
| 9,490,953 | B2* | 11/2016 | Yanover | H04L 5/0053 |
| 9,510,237 | B2* | 11/2016 | Nuss | H04W 28/08 |
| 9,516,657 | B2* | 12/2016 | Marinier | H04W 72/082 |
| 9,544,857 | B2* | 1/2017 | Carter | H04W 52/143 |
| 9,635,678 | B2* | 4/2017 | Austin | H04W 8/18 |
| 9,648,569 | B2* | 5/2017 | Madan | H04W 52/146 |
| 9,655,102 | B2* | 5/2017 | Uplenchwar | H04W 72/0426 |
| 2003/0203717 | A1* | 10/2003 | Chuprun | G06K 13/0825 455/12.1 |
| 2004/0203727 | A1* | 10/2004 | Abiri | H04W 16/06 455/423 |
| 2005/0049877 | A1* | 3/2005 | Agranat | A01K 11/008 704/270 |
| 2005/0255815 | A1* | 11/2005 | Hammerschmidt | H03G 3/3078 455/132 |
| 2006/0068715 | A1* | 3/2006 | Hundal | H04B 17/345 455/67.11 |
| 2007/0242647 | A1* | 10/2007 | Bennett | H04W 88/04 370/338 |
| 2008/0031197 | A1* | 2/2008 | Wang | H04B 7/15542 370/331 |
| 2009/0103741 | A1* | 4/2009 | Skuruls | H03G 1/0088 381/59 |
| 2009/0197588 | A1* | 8/2009 | Khandekar | H04W 72/082 455/422.1 |
| 2010/0039899 | A1* | 2/2010 | Vogt | G01S 7/5273 367/99 |
| 2010/0198304 | A1* | 8/2010 | Wang | A61N 1/3727 607/60 |
| 2011/0151919 | A1* | 6/2011 | Shin | H04W 24/00 455/525 |
| 2012/0250521 | A1* | 10/2012 | Marinier | H04W 72/082 370/241 |
| 2013/0005269 | A1* | 1/2013 | Lindoff | H04J 11/0026 455/63.1 |
| 2013/0044621 | A1* | 2/2013 | Jung | H04W 72/082 370/252 |
| 2013/0058288 | A1* | 3/2013 | Nentwig | H04J 11/0026 370/329 |
| 2013/0121187 | A1* | 5/2013 | Das | H04W 36/0083 370/252 |
| 2014/0011444 | A1* | 1/2014 | Groell | H01Q 21/28 455/39 |
| 2014/0185483 | A1* | 7/2014 | Kim | H04W 24/02 370/252 |
| 2014/0295871 | A1* | 10/2014 | Ahn | H04W 24/10 455/452.1 |
| 2014/0307713 | A1* | 10/2014 | Lindoff | H04J 11/0026 370/332 |
| 2014/0315593 | A1* | 10/2014 | Vrzic | H04W 52/38 455/522 |
| 2015/0282206 | A1* | 10/2015 | Kalhan | H04W 72/1278 370/330 |
| 2015/0289282 | A1* | 10/2015 | Phuyal | H04W 76/14 370/329 |
| 2015/0318945 | A1* | 11/2015 | Abdelmonem | H04L 5/006 370/329 |
| 2016/0037525 | A1* | 2/2016 | Malmirchegini | H04W 24/02 370/329 |
| 2016/0044689 | A1* | 2/2016 | Wen | H04J 11/0023 370/330 |
| 2016/0344488 | A1* | 11/2016 | Ding | H04L 5/0057 |
| 2017/0041117 | A1* | 2/2017 | Marinier | H04W 72/082 |
| 2017/0063484 | A1* | 3/2017 | Naghshvar | H04J 11/0023 |
| 2017/0117997 | A1* | 4/2017 | Park | H04L 5/0057 |
| 2017/0181182 | A1* | 6/2017 | Patel | H04W 72/1231 |
| 2017/0201315 | A1* | 7/2017 | Avellan | H04B 17/40 |

* cited by examiner

DETERMINING POTENTIAL INTERFERENCE IN A WIRELESS NETWORK

TECHNICAL BACKGROUND

There are ongoing challenges associated with the growth and evolution of wireless networks. Two adjacent or neighboring access nodes deploying cells of the same frequency may be subject to interference caused to a wireless device communicating with one of the access nodes. For example, for a first wireless device at a specific location and attached to a serving access node, radio transmissions from other access nodes proximate the first wireless device and/or the serving access node (i.e., neighboring access nodes) may cause interference to the first wireless device at the specific location. Downlink transmissions between the neighboring access nodes and wireless devices connected thereto may cause interference to a wireless link between the first wireless device and the serving access node. Moreover, the interference may vary significantly for wireless devices located at different geographical locations within the coverage area of one or more access nodes. Current interference determination mechanisms may be unable to determine a potential for interference at such specific locations within a network. Moreover, determining interference based on signal losses or radio link failures (RLF) is performed after the fact, and does not provide a proactive method for determining a potential of interference at a specific location.

OVERVIEW

Exemplary embodiments described herein include methods, systems, and processing nodes for determining potential interference in a wireless network. An exemplary method for determining potential interference in a wireless network includes retrieving one or more signal measurements measured by a wireless device at a specific location, determining, based on the one or more signal measurements, the potential interference caused to a first wireless link between a first access node and a first wireless device at the specific location, and performing an adjustment to the wireless network based on the potential interference.

An exemplary system for determining a potential interference in a wireless network includes a processing node, and a processor coupled to the processing node, the processor for configuring the processing node to perform operations comprising determining, at a specific location, a potential interference caused to one or more wireless devices attached to an access node. The potential interference is caused by a plurality of additional access nodes. The operations further comprise performing an adjustment to one or more of the access node or the additional access nodes based on the potential interference. The adjustment comprises one or more of an antenna configuration, an operating mode, or a scheduling scheme.

An exemplary processing node for determining potential interference in a wireless network is configured to perform operations comprising obtaining, at a specific location, a signal measurement of a serving access node and a plurality of signal measurements of a corresponding plurality of neighbor access nodes, determining, based on the signal measurements, a potential interference caused by the plurality of neighbor access nodes to a wireless device attached to the serving access node at the specific location and, upon the potential interference exceeding a threshold, performing an adjustment to one or more of the serving access node and the plurality of neighbor access nodes.

DETAILED DESCRIPTION

In exemplary embodiments disclosed herein, a potential interference is determined for specific geographic locations of a wireless network based on signal measurements performed by wireless devices at said specific geographic locations. Operations described herein include obtaining power measurements of reference signals sensed at a wireless device at a specific location, and determining a potential interference caused at the specific location based on the reference signals power measurements. The power measurements comprise measurements of reference signals power performed by a wireless device at the specific location. The wireless device may perform multiple measurements of signal power at various locations, and submit to the network measurements recorded at each location or store them for further processing. The measurements may be performed periodically or triggered by the network. Further, additional wireless devices may be configured to submit measurements performed at several specific locations within the network.

Thus, a plurality of measurements corresponding to a plurality of locations can be stored on the network, and used to determine a potential interference for each location. The potential interference for the location is useful for determining an adjustment to be made to the network in efforts to mitigate the potential interference. As further described herein, the potential interference is associated with interference that may be caused by downlink signals being transmitted by a plurality of neighboring access nodes. Exemplary embodiments described herein include determining a potential interference for a specific location based on a difference between the power measurements of reference signals transmitted by the neighboring access nodes and a power measurement of a reference signal transmitted by the serving access node.

The potential interference for a specific location may be based on a plurality of measurements submitted by a corresponding plurality of wireless devices at said specific location. Further, potential interference may be determined for a plurality of locations based on measurements provided by one or more wireless devices configured to periodically submit measurements at said plurality of locations. A map may be generated depicting a plurality of interferences caused at a corresponding plurality of specific locations. Further, the adjustment to the network can be based on a combination of the interference caused at a plurality of locations. The adjustments include power control, operating mode, and scheduling operations that may be performed by a controller node in communication with a plurality of access nodes. These and additional operations are further described with respect to the embodiments depicted in FIGS. 1-6 below.

Figure 1:
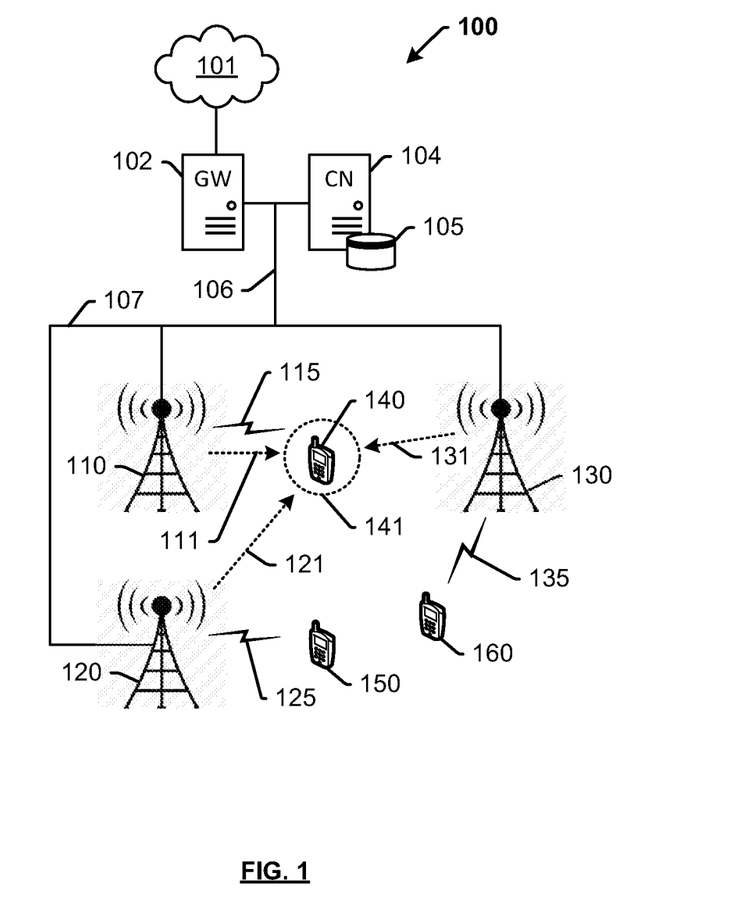
FIG. 1 depicts an exemplary system for determining potential interference in a wireless network.

FIG. 1 depicts exemplary system 100 for determining potential interference in a wireless network. System 100 comprises a communication network 101, gateway 102, controller node 104, access nodes 110, 120, and 130, and wireless devices 140, 150, and 160. Wireless device 140 is shown as accessing services from access node 110 via communication link 115, while wireless devices 150, 160 are respectively depicted as accessing network services from access nodes 120, 130, via links 125, 135. Links 125, 135 respectively from neighboring access nodes 120, 130 may cause interference to wireless device 140 at location 141. Therefore, operations described herein utilize power measurements of downlink reference signals 111, 121, 131 performed at location 141 to determine a potential interference for location 141. The power measurements may include a reference signal receive power (RSRP). The potential interference is useful for predicting an interference that may be caused by neighboring access nodes 120, 130 to any wireless device at location 141 and attached to access node 110. Moreover, wireless device 141 (and other wireless devices in the network) may be configured to perform the power measurements periodically, and at various other locations (see, for example, FIG. 3). Based on the measured power levels and potential interference obtained therefrom, an adjustment can be performed to one or more of access nodes 110, 120, 130. For example, the adjustment may comprise one or more of changing an antenna configuration of access nodes 110, 120, or 130, an operating mode from one frequency band to another, or a scheduling scheme that may be communicated between access nodes 110, 120, 130, and/or executed by a controller node 104.

Access nodes 110, 120, 130 can be any network node configured to provide communication between wireless devices 140, 150 160 and communication network 101. For example, access nodes 110, 120, 130 may include any standard access node, such as a macrocell access node, base transceiver station, a radio base station, an eNodeB device, an enhanced eNodeB device, or the like. Alternatively or in addition, access nodes 110, 120, 130 can be any short range, low power, small access node, such as a femtocell, picocell, home eNodeB (HeNB), or the like. Access nodes 110, 120, 130 can comprise a processor and associated circuitry to execute or direct the execution of computer-readable instructions to perform operations such as those further described herein. Briefly, access nodes 110, 120, 130 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Further, access nodes 110, 120, 130 can receive instructions and other input at a user interface. Access nodes 110, 120, 130 can communicate directly with gateway node 102 and controller node 104 via communication link 106. In some embodiments, access nodes 110, 120, 130 are not connected to the same network 101, but each may be connected to a different network, and correspondingly to different controller and gateway nodes. Further, access nodes 110, 120, 130 may communicate with each other (and with other access nodes that are not shown) using a direct link 107, such as an x2 link or similar.

Wireless devices 140, 150, 160 may be any device, system, combination of devices, or other such communication platform capable of communicating wirelessly with access nodes 110, 120, 130 respectively, using one or more frequency bands deployed therefrom. Wireless devices 140, 150, 160 may be, for example, a mobile phone, a wireless phone, a wireless modem, a personal digital assistant (PDA), a voice over internet protocol (VoIP) phone, a voice over packet (VOP) phone, a voice over LTE (VoLTE) phone, or a soft phone, as well as other types of devices or systems that can exchange audio or data via access nodes 110, 120, 130. Other types of communication platforms are possible.

Communication network 101 can be wired and/or wireless communication networks, and can comprise processing nodes, routers, gateways, and physical and/or wireless data links for carrying data among various network elements, including combinations thereof, and can include a local area network a wide area network, and an internetwork (including the Internet). Communication network 101 can be capable of carrying data, for example, to support voice, push-to-talk, broadcast video, and data communications by wireless devices 140, 150, 160, etc. Wireless network protocols can comprise MBMS, code division multiple access (CDMA) 1×RTT, Global System for Mobile communications (GSM), Universal Mobile Telecommunications System (UMTS), High-Speed Packet Access (HSPA), Evolution Data Optimized (EV-DO), EV-DO rev. A, Third Generation Partnership Project Long Term Evolution (3GPP LTE), and Worldwide Interoperability for Microwave Access (WiMAX). Wired network protocols that may be utilized by communication network 101 comprise Ethernet, Fast Ethernet, Gigabit Ethernet, Local Talk (such as Carrier Sense Multiple Access with Collision Avoidance), Token Ring, Fiber Distributed Data Interface (FDDI), and Asynchronous Transfer Mode (ATM). Communication network 101 can also comprise additional base stations, controller nodes, telephony switches, internet routers, network gateways, computer systems, communication links, or some other type of communication equipment, and combinations thereof.

Communication links 106, 107 can use various communication media, such as air, space, metal, optical fiber, or some other signal propagation path—including combinations thereof. Communication links 106, 107 can be wired or wireless and use various communication protocols such as Internet, Internet protocol (IP), local-area network (LAN), optical networking, hybrid fiber coax (HFC), telephony, T1, or some other communication format—including combinations, improvements, or variations thereof. Wireless communication links can be a radio frequency, microwave, infrared, or other similar signal, and can use a suitable communication protocol, for example, Global System for Mobile telecommunications (GSM), Code Division Multiple Access (CDMA), Worldwide Interoperability for Microwave Access (WiMAX), or Long Term Evolution (LTE), or combinations thereof. Communications links 106, 107 may include S1 or x2 communications links. Other wireless protocols can also be used. Communication links 106, 107 can be a direct link or might include various equipment, intermediate components, systems, and networks. Communication links 106, 107 may comprise many different signals sharing the same link.

Gateway node 102 can be any network node configured to interface with other network nodes using various protocols. Gateway node 102 can communicate user data over system 100 respectively. Gateway node 102 can be a standalone computing device, computing system, or network component, and can be accessible, for example, by a wired or wireless connection, or through an indirect connection such as through a computer network or communication network. For example, gateway node 102 can include a serving gateway (SGW) and/or a public data network gateway (PGW), etc. One of ordinary skill in the art would recognize that gateway node 102 is not limited to any specific technology architecture, such as Long Term Evolution (LTE) and can be used with any network architecture and/or protocol.

Gateway node 102 can comprise a processor and associated circuitry to execute or direct the execution of computer-readable instructions to obtain information. Gateway nodes 102 can retrieve and execute software from storage, which can include a disk drive, a flash drive, memory circuitry, or some other memory device, and which can be local or remotely accessible. The software comprises computer programs, firmware, or some other form of machine-readable instructions, and may include an operating system, utilities, drivers, network interfaces, applications, or some other type of software, including combinations thereof. Gateway node 102 can receive instructions and other input at a user interface.

Controller node 104 can be any network node configured to communicate information and/or control information over system 100 respectively. Controller node 104 can be configured to transmit control information associated with a handover procedure. Controller node 104 can be a standalone computing device, computing system, or network component, and can be accessible, for example, by a wired or wireless connection, or through an indirect connection such as through a computer network or communication network. For example, controller node 104 can include a mobility management entity (MME), a Home Subscriber Server (HSS), a Policy Control and Charging Rules Function (PCRF), an authentication, authorization, and accounting (AAA) node, a rights management server (RMS), a subscriber provisioning server (SPS), a policy server, etc. One of ordinary skill in the art would recognize that controller node 104 is not limited to any specific technology architecture, such as Long Term Evolution (LTE) and can be used with any network architecture and/or protocol.

Controller node 104 can comprise a processor and associated circuitry to execute or direct the execution of computer-readable instructions to obtain information. Controller node 104 can retrieve and execute software from storage, which can include a disk drive, a flash drive, memory circuitry, or some other memory device, and which can be local or remotely accessible. In an exemplary embodiment, controller node 104 respectively include database 105 for storing information related to access nodes 110, 120, 130, such as an antenna configuration, scheduling scheme, operating mode, etc., as well as correlations thereof with various locations within system 100, such as location 141. This information may be requested by or shared with access nodes 110, 120, 130 via connections 106, 107, ×2 connections, and so on. The software comprises computer programs, firmware, or some other form of machine-readable instructions, and may include an operating system, utilities, drivers, network interfaces, applications, or some other type of software, and combinations thereof. Controller node 104 can receive instructions and other input at a user interface.

Other network elements may be present in system 100 to facilitate communication but are omitted for clarity, such as base stations, base station controllers, mobile switching centers, dispatch application processors, and location registers such as a home location register or visitor location register. Furthermore, other network elements that are omitted for clarity may be present to facilitate communication, such as additional processing nodes, routers, gateways, and physical and/or wireless data links for carrying data among the various network elements, e.g. between access nodes 110, 120, 130, and communication network 101.

Figure 2:
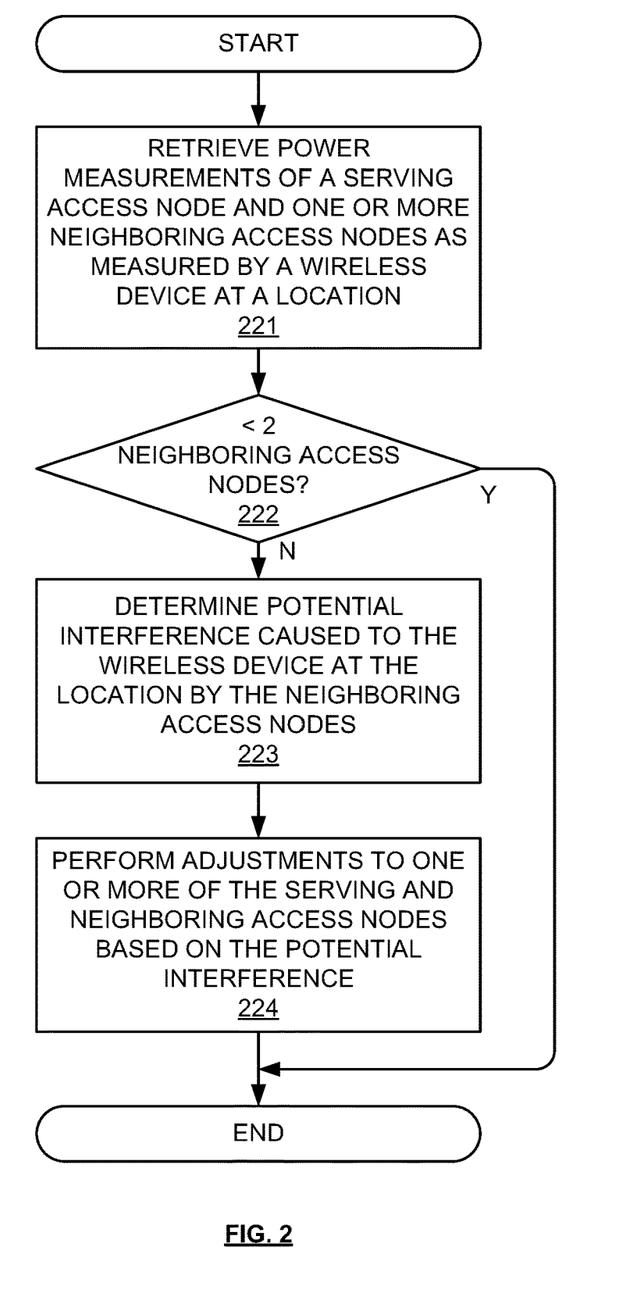
FIG. 2 depicts an exemplary method for determining potential interference in a wireless network.

FIG. 2 depicts an exemplary method for determining potential interference in a wireless network. The method of FIG. 2 is illustrated with respect a network node such as controller node 104 or access nodes 110, 120, 130 of FIG. 1. In other embodiments, the method can be implemented with any suitable network element. Although FIG. 2 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 221, power measurements of reference signals from a serving access node and a plurality of neighboring access nodes are measured at a wireless device at a specific location. The power measurements comprise measurements of a reference signal transmitted by each access node and sensed at the wireless device. The measurements may be part of a "parameter record" associated with the specific location. A log may be generated comprising a plurality of parameters records measured by the wireless device, including a latitude, a longitude, a serving RSRP value, a neighboring sector count, and one or more neighboring RSRP values. The parameter record may include additional parameters such as a reference signal receive quality (RSRQ), as well as a signal-to-interference noise ratio (SINR). These parameters may be measured by an application on the wireless device, transmitted to controller for storage in a database, or stored on a logging device for further processing. Moreover, the parameters may be measured periodically or triggered by the network. For example, a wireless device may be configured to periodically transmit and report to the network signal measurements, wherever it is located, or wherever a location change is detected. In another embodiment, a wireless device may be commanded by the network to perform a signal measurement when it is in a specific location. The specific location may comprise a GPS coordinate, such that when a location sensor of the wireless device determines that the wireless device is at or nearby the GPS coordinate, it is triggered to perform a signal measurement. In an exemplary embodiment, one or more radio link failure (RLF) reports are previously received by the network for a specific location, and wireless devices near that location are prompted or triggered to perform signal measurements, in an effort to determine if the RLF was caused by interference verses other reasons such as poor RF coverage. The parameters may be retrieved from the wireless device periodically, or stored on the network. It is important to note that the RSRP measurements for the serving and adjacent access nodes are not affected by interference or access node traffic load, unlike the RSRQ, SINR, or other parameters measured by the wireless device. For example, the SINR is dependent on not only the downlink signal strengths for the serving access node and the neighboring access nodes, but also on the downlink traffic of the neighboring access node. Whereas the RSRP remains relatively constant for different times and loads. Therefore, basing a potential interference of the location based on the RSRP ensures that measurements performed at any time are relevant to a potential interference determination. Such a determination independent from time of day or load on adjacent interfering nodes, and may not be possible using RSRQ, SINR, or other parameters that fluctuate based on time/load or other factors.

At 222, it is determined whether there is only 1 neighboring access node. If yes, the method ends, as it is possible that a reference signal power of only 1 access node does not have the potential to cause interference at the specific location. For example, when a device is performing signal measurements to initiate a handover to a neighbor, the neighbor's RSRP may exceed the serving cell's RSRP by a threshold. In this case, there is no potential interference. However, if there is more than one neighbor whose RSRP (or the aggregate RSRP of the neighbors) exceeds the serving cell's RSRP by a threshold, then a potential interference may be determined at 223.

At 223, the potential interference for the specific location may be based on a measurements submitted by one or more wireless devices at said specific location. As further described herein and with respect to FIG. 5, the potential interference is determined based on a difference between the aggregate of the power measurements of reference signals received from the neighboring access nodes and a power measurement of a reference signal received from the serving access node.

At 224, based on the potential interference, an adjustment to the network can be made. For example, the potential interference (i.e. scaled or unscaled difference between aggregate power of neighboring access nodes and power of serving access node) may exceed a threshold in order to determine whether or not an adjustment is needed. Moreover, the adjustment may be based on a plurality of potential interferences at a plurality of locations. The adjustments include antenna configuration, power control, operating mode, and scheduling operations. For example, an antenna angle of neighboring access nodes may be tilted away from the specific location by a set degree, if the potential interference for that location exceeds a threshold. A transmit power of the antenna or access node that the antenna is coupled to may be adjusted to minimize the potential interference. Several other methods for minimizing interference will be evident to those having ordinary skill in the art, in light of the potential interference determination operations disclosed herein.

Figure 3:
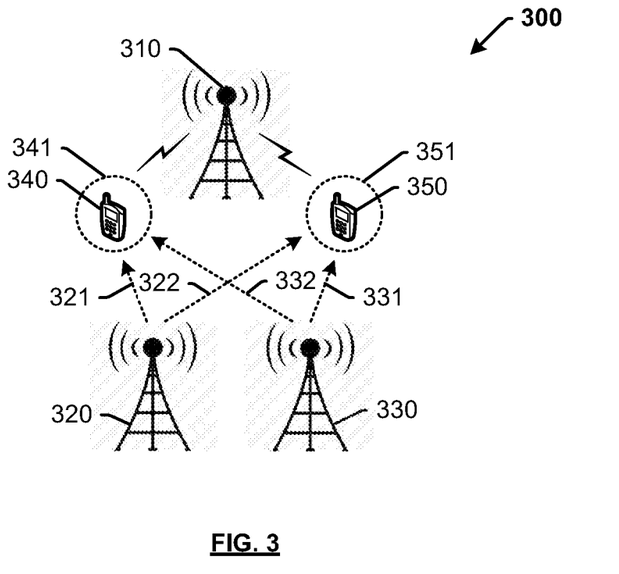
FIG. 3 depicts another exemplary system for determining potential interference in a wireless network.

FIG. 3 depicts another exemplary system 300 for determining potential interference in a wireless network. System 300 comprises access nodes 310, 320, and 330, and wireless devices 340 and 350 shown as accessing services from access node 310 from locations 341 and 351, respectively. Although not shown, communication networks, gateway nodes, and controller nodes may be present as necessary to enable communication between access nodes 310, 320, 330 and other network entities, similar to system 100 depicted in FIG. 1.

In operation, a potential interference may be determined for locations 341 and 351 based on measurements provided by wireless devices 340 or 350 respectively (or by any other wireless device at locations 341, 351). For example, downlink reference signals 321 from neighbor access node 320, and 332 from neighbor access node 330, are measured by wireless device 340 at location 341, and submitted to the network. The measurements of signals 321, 332 are used to determine a potential interference for location 341. Similarly, downlink reference signals 322 from neighbor access node 320, and 331 from neighbor access node 330, are measured by wireless device 350 at location 351, and submitted to the network. The measurements of signals 322, 331 are used to determine a potential interference for location 351.

Thus, potential interference determinations for a plurality of locations may be used to determine adjustments to make to one or more of access nodes 310, 320, and 330 to minimize the potential interference. For example, the potential interference at location 341 is useful for predicting an interference that may be caused more directly by neighboring access node 320 (i.e. based on reference signal 321) than neighboring access node 330 (i.e. based on reference signal 332). An aggregate signal level of reference signals 321 and 332 may be determined, with reference signal 321 being weighted more than reference signal 332. Similarly, the potential interference at location 351 is useful for predicting an interference that may be caused more directly by neighboring access node 330 (i.e. based on reference signal 331) than neighboring access node 320 (i.e. based on reference signal 322), such that an aggregate signal level of reference signals 331 and 322 may be determined, with reference signal 331 being weighted more than reference signal 322.

In other words, different adjustments may be performed at each access node based on where in system 300 the potential interference exceeds a threshold. The adjustment may comprise one or more of changing an antenna configuration of access nodes 310, 320, or 330, an operating mode from one frequency band to another, or a scheduling scheme that may be communicated between access nodes 310, 320, 330. A load of each access node may be taken into account during determination of adjustments. For example, if the potential for interference is high, and the interfering nodes are loaded, actual interference may be encountered in the form of a radio link failure (RLF) or lower signal-to-interference noise ratio (SINR), and adjustment performed accordingly.

Figure 4:
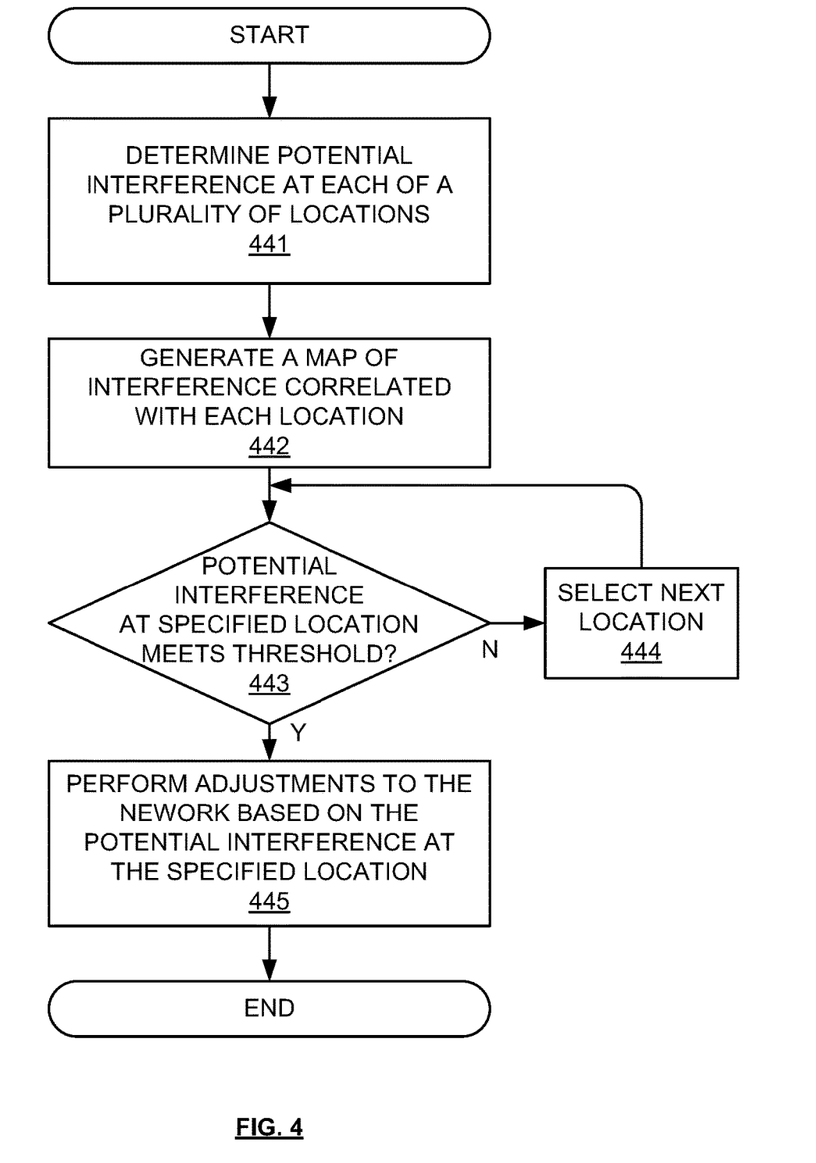
FIG. 4 depicts an exemplary method for performing adjustments to a wireless network based on potential interference determined for a specific location.

FIG. 4 depicts an exemplary method for performing adjustments to a wireless network based on potential interference determined for a specific location. The method of FIG. 4 is illustrated with respect to system 300 of FIG. 3. The method can be implemented with any suitable network element. Although FIG. 4 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

At 441, a potential interference is determined for a plurality of locations within the wireless network. The potential interference may be determined for each location based on measurements provided by wireless devices at said each location. The wireless devices may sense and measure a signal power of a downlink reference signal from serving and neighbor access nodes at each location, and submit the measurements to the network or log them for further processing. Then, at 442, a map may be generated depicting the potential interference caused at each location. The map enables determination of whether or not the potential interference rises to meet a threshold such that adjustments are needed to the network. The threshold determination at 443 selects each location and determines whether or not the potential interference for that location exceeds the threshold. For example, a potential interference at a first location is useful for predicting an interference that may be caused more directly by neighboring access nodes closer to the first location than neighboring access nodes far from that location. The potential interference determinations for each location are based on the aggregate of reference signals transmitted from each neighboring access node relative to the serving node reference signal. If the potential interference for a specific location is below a threshold (or there is no potential interference), then another location is selected at 444. If no additional locations exist, the method may end.

For each location where the potential interference meets a threshold, adjustments 445 may be performed to the network based on the interference at said location, and taking into account interference at nearby locations. The adjustments may comprise one or more of changing an antenna configuration of the access nodes adjacent to the specific location, an operating mode from one frequency band to another, or a scheduling scheme. A load of each access node may be taken into account during determination of adjustments. For example, neighboring sectors having higher loads may cause more interference on devices connected to the serving sector, and determining the load of neighbors as well as the difference between the aggregate reference signals of each neighbor and the serving node can enable a prediction as to which highly-loaded neighbor can potentially cause high interference, regardless of the neighboring nodes' load at the time of the measurements. Further, the adjustments may be based on the time that the measurements were performed. For example, if certain access nodes are loaded at certain times, then the adjustments may differ from other times when the access nodes are not loaded. Adjustments such as antenna tilting may be permanent or continue until measurements change.

Figure 5:
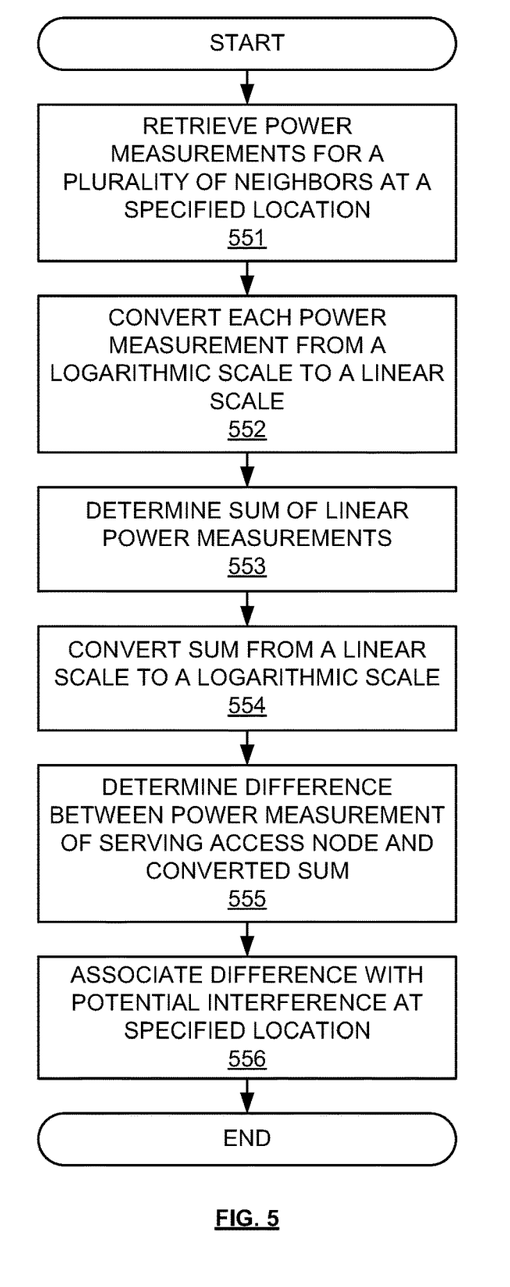
FIG. 5 depicts an exemplary method for determining potential interference from power measurements at a specific location.

FIG. 5 depicts an exemplary method for determining potential interference from power measurements at a specific location. The method of FIG. 5 is illustrated with respect to either of systems 100, 300, and can be implemented with any suitable network element. Although FIG. 5 depicts steps performed in a particular order for purposes of illustration and discussion, the operations discussed herein are not limited to any particular order or arrangement. One skilled in the art, using the disclosures provided herein, will appreciate that various steps of the methods can be omitted, rearranged, combined, and/or adapted in various ways.

The method begins at 551, with retrieval of power measurements for a plurality of neighbors at a specific location. The power measurements may be associated with the specific location. The power measurements may be of reference signals from a serving access node and a plurality of neighboring access nodes measured by a wireless device at the specific location. The power measurements may be performed periodically or triggered by the network. For example, a wireless device may be configured to periodically transmit and report to the network signal measurements wherever it is located. In another embodiment, a wireless device may be commanded by the network or a locally-installed logging application to perform a signal measurement when it is in a specific location. The specific location may comprise a GPS coordinate, such that when a location sensor of the wireless device determines that the wireless device is at or nearby the GPS coordinate, it is triggered to perform a signal measurement. In an exemplary embodiment, one or more radio link failure (RLF) reports are previously received by the network for a specific location, and wireless devices near that location are prompted or triggered to perform signal measurements, in an effort to determine if the RLF was caused by a potential interference, as opposed to other reasons such as coverage gap. For instance, upon determining an RLF for a specific location, all neighboring access nodes' measured RSRP may be used to determine the potential interference, and a threshold may be adjusted or eliminated in efforts to correlate the potential interference with the RLF.

At 552, to enable calculating an aggregate or total power level of measured signals from neighboring access nodes, each power measurement is converted from a logarithmic scale to a linear scale. For example, the power levels may be reported by the wireless device in a logarithmic scale, i.e. dBm (decibels per milliwatt), and converted into a linear scale, i.e. milliwatts (mW), prior to being aggregated at 553. In an exemplary embodiment, the conversion uses the formula: $P(mW)=10^{\wedge}(P(dBm)/10)$. This conversion enables the linear summation of the power levels of each neighboring access node. Then, at 554, the aggregate power of the neighboring access nodes can be converted back into the logarithmic scale, i.e. from mW to dBm using, for instance, the formula: $P(dBm)=10*\log(P(mW))$, with the log being in base 10.

At 555, a difference is determined between the power measurement of the serving access node and the aggregated power measurement of the neighboring access nodes. For example, the aggregated RSRP of the neighboring access nodes, as determined in steps 553-554, is subtracted from the RSRP of the serving access node. This difference of the total power level from a power level of the serving access node may be referred to as a serving sector to interferer gap (SSIG). This difference may exceed a threshold in order to determine if a potential interference exists for the specific location. For example, a higher positive number indicates lower potential interference, while values below 0 indicate a potential for interference. Therefore, meeting the threshold includes meeting a low threshold upon which a level of potential interference can be determined. The SSIG may be scaled for convenient representation of the potential interference, or may be directly correlated with the potential interference.

At 556, the SSIG for each location is associated with a potential interference for said each location. For example, the SSIG/potential interference is associated with the parameter record for each specific location. Various parameters such as RSRP and SINR may be correlated for specific locations. For example, an RSRP range may be determined for a number of locations having poor SINR, to determine locations in the network having poor RF conditions (as opposed to potential interference). Upon the potential interference meeting a threshold, adjustments can be performed on the wireless network as described above. An interference may be predicted for a plurality of locations around the specific locations using the potential interference of the specific location. Moreover, wireless devices in locations around a specific location associated with high potential interference may be triggered to perform additional measurements and report parameters.

The methods, systems, devices, networks, access nodes, and equipment described above may be implemented with, contain, or be executed by one or more computer systems and/or processing nodes. The methods described above may also be stored on a non-transitory computer readable medium. Many of the elements of communication systems 100, 300 may be, comprise, or include computers systems and/or processing nodes. This includes, but is not limited to: access nodes 110, 120, 130, 310, 320, 330, controller node 104, and/or network 101.

Figure 6:
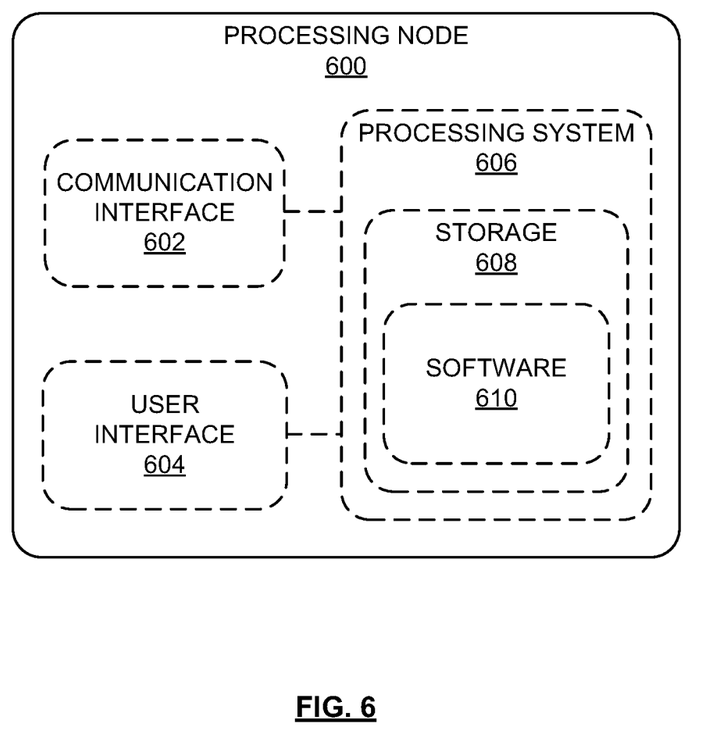
FIG. 6 depicts an exemplary processing node for determining potential interference in a wireless network.

FIG. 6 depicts an exemplary processing node comprising a communication interface 602, user interface 604, and processing system 606 in communication with communication interface 602 and user interface 604. Processing system 606 includes storage 608, which can comprise a disk drive, flash drive, memory circuitry, or other memory device. Storage 608 can store software 610 which is used in the operation of the processing node 600. Storage 608 may include a disk drive, flash drive, data storage circuitry, or some other memory apparatus. For example, storage 608 may include a buffer. Software 610 may include computer programs, firmware, or some other form of machine-readable instructions, including an operating system, utilities, drivers, network interfaces, applications, or some other type of software. For example, software 610 may include a coherence determination module. Processing system 606 may include a microprocessor and other circuitry to retrieve and execute software 610 from storage 608. Processing node 600 may further include other components such as a power management unit, a control interface unit, etc., which are omitted for clarity. Communication interface 602 permits processing node 600 to communicate with other network elements. User interface 604 permits the configuration and control of the operation of processing node 600.

The exemplary systems and methods described herein can be performed under the control of a processing system executing computer-readable codes embodied on a computer-readable recording medium or communication signals transmitted through a transitory medium. The computer-readable recording medium is any data storage device that can store data readable by a processing system, and includes both volatile and nonvolatile media, removable and non-removable media, and contemplates media readable by a database, a computer, and various other network devices.

Examples of the computer-readable recording medium include, but are not limited to, read-only memory (ROM), random-access memory (RAM), erasable electrically programmable ROM (EEPROM), flash memory or other memory technology, holographic media or other optical disc storage, magnetic storage including magnetic tape and magnetic disk, and solid state storage devices. The computer-readable recording medium can also be distributed over network-coupled computer systems so that the computer-readable code is stored and executed in a distributed fashion. The communication signals transmitted through a transitory medium may include, for example, modulated signals transmitted through wired or wireless transmission paths.

The above description and associated figures teach the best mode of the invention. The following claims specify the scope of the invention. Note that some aspects of the best mode may not fall within the scope of the invention as specific by the claims. Those skilled in the art will appreciate that the features described above can be combined in various ways to form multiple variations of the invention. As a result, the invention is not limited to the specific embodiments described above, but only by the following claims and their equivalents.

What is claimed is:

1. A method for determining a potential interference in a wireless network, the method comprising:
retrieving one or more signal measurements measured by a wireless device at a specific location, wherein the one or more signal measurements comprise power measurements of one or more signals transmitted by a serving access node and a corresponding one or more neighboring access nodes, and wherein the power measurements are reported by the wireless device in a logarithmic scale;
converting the power measurements from the logarithmic scale to a linear scale;
determining an aggregate of the one or more signal measurements based on the converted power measurements;
determining, based on the aggregate of the one or more signal measurements, the potential interference caused to a first wireless link between the serving access node and a first wireless device at the specific location; and
performing an adjustment to the wireless network based on the potential interference.

2. The method of claim 1, wherein the one or more signals comprise a downlink reference signal.

3. The method of claim 2, wherein the power measurement is a reference signal receive power (RSRP).

4. The method of claim 1, wherein the power measurement of the one or more signals comprises a power measurement of the first wireless link.

5. The method of claim 4, wherein determining the potential interference further comprises determining a difference between the aggregate of the one or more signal measurements and the power measurement of the first wireless link.

6. The method of claim 5, further comprising scaling the difference to determine the potential interference.

7. The method of claim 6, wherein the adjustment to the wireless network is performed at the specific location based on the potential interference meeting a threshold.

8. The method of claim 5, wherein determining the potential interference further comprises converting the aggregate of the one or more signal measurements from the linear scale to the logarithmic scale prior to determining the difference between the aggregate of the one or more signal measurements and the power measurement of the first wireless link.

9. The method of claim 8, wherein converting the power measurements from the logarithmic scale to a linear scale comprises converting the power measurements from decibels per milliwatt to milliwatts, and wherein converting the aggregate of the one or more signal measurements comprises converting the aggregate from milliwatts to decibels per milliwatt.

10. The method of claim 1, wherein the adjustment is performed on one or more of an antenna configuration, an operating mode, or a scheduling scheme.

11. A system for determining a potential interference in a wireless network, the system comprising:
a processing node; and
a processor coupled to the processing node, the processor for configuring the processing node to perform operations comprising:
retrieving one or more signal measurements measured by one or more wireless devices at a specific location, wherein the one or more signal measurements comprise power measurements of one or more signals transmitted by a serving access node and a plurality of neighboring access nodes, and wherein the power measurements are reported by the one or more wireless devices in a logarithmic scale;
converting the power measurements from the logarithmic scale to a linear scale;
determining an aggregate of the one or more signal measurements based on the converted power measurements;
determining, at the specific location, a potential interference caused to the one or more wireless devices attached to the serving access node, wherein the potential interference is caused by the plurality of neighboring access nodes; and performing an adjustment to one or more of the serving access node or the plurality of neighboring access nodes based on the potential interference,
wherein the adjustment comprises one or more of an antenna configuration, an operating mode, or a scheduling scheme.

12. The system of claim 11, wherein the signal measurement is triggered at the one or more wireless devices by an event.

13. The system of claim 12, wherein the event comprises a network command.

14. The system of claim 12, wherein the event comprises an expiration of a periodic timer.

15. The system of claim 11, wherein determining the potential interference is based on an aggregate power level exceeding a threshold.

16. The system of claim 11, wherein the operations further comprise determining an additional potential interference caused by a second plurality of neighboring access nodes at a second specific location, and performing the adjustment based on a combination of the potential interference caused at the specific location and the additional potential interference caused at the second specific location.

17. The system of claim 16, wherein the operations further comprise generating a map of a plurality of potential interferences caused at a corresponding plurality of specific locations.

18. A processing node for determining potential interference in a wireless network, the processing node being configured to perform operations comprising:
obtaining, at a specific location, a signal measurement of a serving access node and a plurality of signal measurements of a corresponding plurality of neighbor access nodes, wherein the signal measurement of the serving access node and the plurality of signal measurements of the corresponding plurality of neighbor access nodes comprise power measurements, and wherein the power measurements are reported by one or more wireless devices in a logarithmic scale;
converting the power measurements from the logarithmic scale to a linear scale;
determining an aggregate of the signal measurements based on the converted power measurements;
determining, based on the aggregate of the signal measurements, a potential interference caused by the plurality of neighbor access nodes to a wireless device attached to the serving access node at the specific location; and
upon the potential interference exceeding a threshold, performing an adjustment to one or more of the serving access node and the plurality of neighbor access nodes,
wherein the first and second signal measurements are periodically measured by the wireless device.

* * * * *